United States Patent
Tavani

(10) Patent No.: US 8,295,463 B2
(45) Date of Patent: Oct. 23, 2012

(54) METHOD AND SYSTEM FOR DECOUPLING A CALLING APPLICATION FROM AN EXTERNAL APPLICATION

(75) Inventor: Ornella Tavani, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 672 days.

(21) Appl. No.: 12/562,292

(22) Filed: Sep. 18, 2009

(65) Prior Publication Data

US 2010/0067682 A1   Mar. 18, 2010

(30) Foreign Application Priority Data

Sep. 18, 2008   (EP) ..................................... 08016407

(51) Int. Cl.
*H04M 3/42*        (2006.01)
(52) U.S. Cl. ......... 379/207.02; 379/201.01; 379/201.02; 379/201.05
(58) Field of Classification Search ............. 379/207.02, 379/201.01, 201.03, 201.05, 201.02
See application file for complete search history.

(56) References Cited

U.S. PATENT DOCUMENTS

| | | | |
|---|---|---|---|
| 5,280,610 A | | 1/1994 | Travis, Jr. et al. |
| 7,047,517 B1 | | 5/2006 | Brown et al. |
| 7,823,170 B2 * | | 10/2010 | Jolfaei et al. .................. 719/330 |
| 2005/0028174 A1 * | | 2/2005 | Rossmann et al. ............ 719/328 |

FOREIGN PATENT DOCUMENTS

EP         0472279 A2    2/1992
* cited by examiner

*Primary Examiner* — Thjuan K Addy
(74) *Attorney, Agent, or Firm* — Laurence A. Greenberg; Werner H. Stemer; Ralph E. Locher

(57) ABSTRACT

A method and a system for decoupling a calling application from an external application in a manufacturing execution system, wherein the calling application interacts with the external application by requesting the execution of one or more external methods defined within the external application. First, the calling application obtains three lists from the external application, namely, the available external method list containing the ordered list of the available external methods, the usable parameter list containing the ordered list of the parameters usable by the external methods, and the signature list containing the list of signatures of the external method. The term signature indicated a coded way to define a method interface. The calling application requests a command to call a given external method from the external application by performing the following sub-steps: assigning, for the requested given method, a value to the position index within the available method list; getting the signature of the given method from the signature list by applying its position index; gathering, from the usable parameter list, the required parameters of the given method as indicated from its signature; and generating the command to call the external method with its required parameters.

6 Claims, 1 Drawing Sheet

METHOD AND SYSTEM FOR DECOUPLING A CALLING APPLICATION FROM AN EXTERNAL APPLICATION

CROSS-REFERENCE TO RELATED APPLICATION

This application claims the priority, under 35 U.S.C. §119, of European patent application EP 08 016 407.2, filed Sep. 18, 2008; the prior application is herewith incorporated by reference in its entirety.

BACKGROUND OF THE INVENTION

Field of the Invention

The present invention relates to a method and to a system for decoupling a calling application from an external application in a manufacturing execution system. The calling application interacts with the external application by requesting the execution of one or more external methods defined within the external application.

Software products for industrial control and automation have increased, with time, in scope and refinement in order to fit the great variety of IT infrastructure requirements of manufacturing companies.

As defined by the Manufacturing Enterprise Solutions Association (MESA International), a Manufacturing Execution System (MES) "is a dynamic information system that drives effective execution of manufacturing operations," by managing "production operations from point of order release into manufacturing to point of product delivery into finished goods" and by providing "mission critical information about production activities to others across the organization and supply chain via bi-directional communication."

For example, Siemens Corporation offers a broad range of MES products, under its SIMATIC® product family.

As used herein, a software application refers to a set of software components developed by software developers, at developing time, to perform some useful actions within a MES system, such as, for example, monitoring values coming from plant processes or controlling plant devices.

Typically, at engineering time, system engineers flexibly customize MES applications according to the specific manufacturing plant requirements. The MES application customization by system engineers is an important task in MES applications. In fact, software developers, at developing time, do not have the specific knowledge of specific plant requirement and thus develop a more general purpose MES application. It is then the subsequent task of system engineers to customize, at engineering time, the MES application to perform specific actions via business logics according the specific requirements of a specific manufacturing plant.

Often, in complex MES applications, part of the business logics is external to the main module. There are several reasons for the convenience of separating the calling application of a main module from one or more external applications where several procedures or methods are defined.

A first reason may be that part of the application is designed to be "expandable" and thus it is better than it is kept separate from the main module in an external application module.

A second reason may be that the so called external module is developed and maintained by a separated development group.

A third reason may be that the external module is implemented with a different technology.

A fourth reason may be that some requirements of the business logic are to be implemented at a later time, after the first release of the software.

Reference is now had to FIG. 1, which is a diagram schematically illustrating a calling application interacting with an external application, for example within a MES application.

FIG. 1 shows a main module representing the calling application CA and an external application EA providing different business logics in the form of methods or procedures $EM_1$, $EM_2$, ..., $EM_n$.

The calling application CA contains code invoking the external methods $EM_1$, $EM_2$, ..., $EM_n$ of the external application EA. Let us exemplify a portion of invoking code as follows:

Call $EM_1(p_1,p_2)$
Call $EM_2(p_2,p_3,p_4)$
...

where $p_1, p_2, \ldots$ denote the parameters of the called method $EM_1, \ldots, EM_n$ Examples of MES applications that may be designed with an architecture having a calling application CA and an external application EA are material management applications, production order applications, product definition management applications, runtime data management applications (e.g. bar code reader, alarms and others), operations schedulers applications and other applications.

Unfortunately when a change is made to the interface of a method $EM_1, \ldots, EM_n$ of the external application EA, it is also necessary to modify the calling application CA code so that the calls to the method are consistent with the new method interface.

SUMMARY OF THE INVENTION

It is accordingly an object of the invention to provide a method and a system for decoupling a calling application (CA) from an external application (EA) which overcomes the above-mentioned disadvantages of the heretofore-known devices and methods of this general type so that, when modifications are done to a procedure interface of the external application, no changes are required to the code of the calling application CA.

With the foregoing and other objects in view there is provided, in accordance with the invention, a method for decoupling a calling application from an external application in a manufacturing execution system, wherein the calling application interacts with the external application by requesting the execution of one or more external methods defined within the external application. The method comprises the following steps:

by the calling application, acquiring from the external application three lists, the three lists including:
an available external method list containing an ordered list of available external methods;
a usable parameter list containing an ordered list of parameters usable by the external methods; and
a signature list containing a list of signatures of the external method, a signature indicating a coded way to define a method interface;

by the calling application, requesting a command to call a given external method from the external application, by performing the following sub-steps:
assigning, for a given requested method, a value to a position index within the available method list;
acquiring the signature of the given method from the signature list by applying a position index thereof;

gathering, from the usable parameter list, required parameters of the given method as indicated from the signature thereof; and generating a command to call the external method with the required parameters.

In other words, the objects of the invention are achieved with the method and a corresponding system for decoupling a calling application from an external application in a manufacturing execution system, wherein the calling application interacts with the external application by requesting the execution of one or more external methods defined within the external application, comprising:

the calling application obtains from the external application three lists: the available external method list containing the ordered list of the available external methods, the usable parameter list containing the ordered list of the parameters usable by the external methods and the signature list containing the list of signatures of the external method, wherein by signature is indicated a coded way to define a method interface;

the calling application requests a command to call a given external method from the external application, by performing the following sub-steps:

assigning, for the requested given method, a value to the position index within the available method list;

getting the signature of the given method from the signature list by applying its position index;

gathering, from the usable parameter list, the required parameters of the given method as indicated from its signature;

generating the command to call the external method with its required parameters.

In accordance with an added feature of the invention, the request for a command to call a given external method in step b) may preferably be given by name and the substep of assigning the position index value may conveniently be performed after searching the method name within the available method list.

In accordance with an additional feature of the invention, the request for a command to call a given external method in step b) is given by index and the substep of assigning the position index value is performed by assigning the given input index number.

In accordance with a preferred implementation of the invention, the signatures may advantageously be expressed in binary form.

It is further preferable when the external methods are control check operations.

In accordance with another feature of the invention, step a) may either be performed at startup, or via a polling at a given time interval or at a signaled event or at any combination of the previous alternatives.

The method described in the foregoing may advantageously be implemented in software and/or in combined software and hardware system implementation.

In sum, the proposed invention allows modifying the interface of a method without modifying the calling application.

Other features which are considered as characteristic for the invention are set forth in the appended claims.

Although the invention is illustrated and described herein as embodied in decoupling a calling application from an external application, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
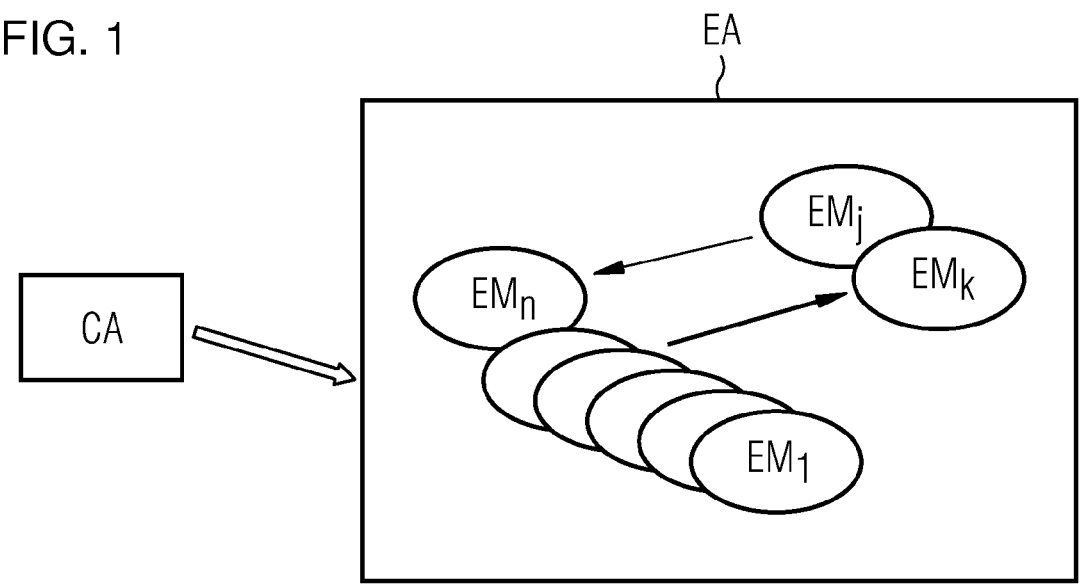
FIG. 1 is a diagram, as described above, schematically illustrating a calling application interacting with an external application.

Let us define, in the context of this invention, the meaning of terms such as available external methods, usable parameters and signatures:

the available external methods are the external methods or procedures available in the external application EA which can be called by the calling application CA;

the usable parameters are the parameters usable by the external methods $EM_1, EM_2, \ldots, EM_n$. The set of usable parameters are a super-set of the actual parameters used by the external methods $EM_1, EM_2, \ldots, EM_n$;

the signatures are the signatures for the external methods $EM_1, EM_2, \ldots, EM_n$.

The signature indicates a coded way to define the method interface, i.e. what are the parameters and what is the parameter order requested by the method. For example, in an embodiment of the present invention, the signature of a method may be a binary word with as many bits as the number of parameters included in the parameter list and to be applied to the parameter list as exemplified in the example of the embodiment later illustrated.

The calling application CA calls an initializing procedure which in turn calls an initialization procedure of the external application EA which replies by returning the following three lists:

an ordered list of available external methods, hereinafter denoted as available method list;

an ordered list of the complete set of parameters usable by the collection of external methods, hereinafter denoted as usable parameter list;

an ordered list of the signature of the external methods, hereinafter denoted as signature list.

The three above returned lists are saved by the calling application CA during the initializing procedure.

The above mentioned initializing procedure may be invoked by the calling application either at startup, or, at runtime, via a configurable polling or at a signaled event; or at any combination of the previous alternatives.

In fact, there are a large variety of possible scenarios which have a direct impact on the optimal time in which the calling application CA should acquire the information regarding the external methods.

Different approaches to be used may depend on type of applications and on the changing rate of the relevant external method data.

In a first scenario, the calling application CA has the function of an engineering application to define data, processes and procedures (e.g. definition of products, definition of data). In this scenario, the calling application CA may advantageously acquire the information on the external methods each time it is launched, at startup, with a frequency that could be once or more times a day.

In a second scenario, the calling application CA has the function of a runtime application (e.g. insertion of materials, execution of production orders) which requires to be kept "alive" on a continuous basis. In this scenario, the calling application CA may conveniently acquire the information on the external methods at startup and then via polling, whose time interval may configured upon the specific plant requirements.

In other scenarios, it may be not be efficient to acquire the external method data on a regular basis, at given time intervals, being such external methods very numerous. In these scenarios, the calling application CA may conveniently acquire the information on the external methods only at certain notified events. For example, when relevant external method data are modified in the external application, a notification may be sent to the calling application CA so to acquire the relevant data.

An efficient and flexible configuration of the calling application may involve any combination of relevant data acquisition at startup, relevant data acquisition via a configurable polling and relevant data acquisition at a signaled event.

Figure 2:
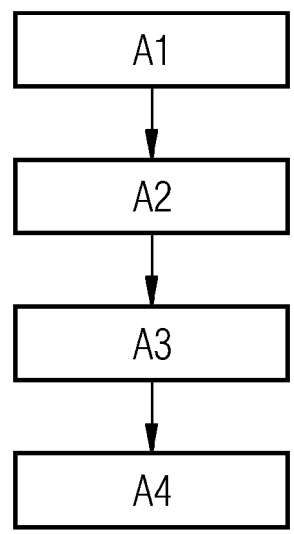
FIG. 2 is a flowchart illustrating a generation of a request for a command to a method call from an external application according to an exemplary embodiment of the present invention.

FIG. 2 is a flowchart schematically illustrating a generation of a request for a command to a method call from external application according to an example embodiment of the present invention.

At run time, the calling application CA requests the command to call a given external method from the external application EA, by performing the following steps:
at step A1, assigning, for the requested given method, a value to the position index within the available method list;
at step A2, getting the signature of the given method from the signature list by applying its position index;
at step A3, gathering, from the usable parameter list, the ordered parameters of the given method as required from the acquired signature;
at step A4, generating the command to call the external method with its required parameters.

Thus, upon request, the generated command to call a given external method may be used to actually make a call to the given external method itself.

The proposed invention allows to modify the interface of a method without modifying the calling application CA. If the new method interface requires parameters not defined in the usable parameter list, then an "ad hoc" signaled event enables the calling application to acquire the new usable parameter list from the external application CA.

Step A1 may be performed either by searching the requested method by name within the available list or by assigning a position index value the input number given by the calling application CA.

Below we illustrate an exemplary embodiment in which there are five external methods and a list of nine usable parameters.

Let us denote with AM the ordered list of available methods of the external application EA, with PARS the ordered list of usable parameters and with SIGNS the ordered list of signatures of the available external methods.

In this example, let us assume that the list of usable parameters PARS is composed of nine parameters denoted as follows:
PARS=[$p_1$, $p_2$, $p_3$, $p_4$, $p_5$, $p_6$, $p_7$, $p_8$, $p_9$].

Let us denote the five external methods of the external application EA with their associated parameters as follows:

$f_1(p_1, p_2, p_3)$
$f_2(p_2, p_5)$
$f_3(p_7, p_8)$
$f_4(p_6)$
$f_5(p_1, p_4, p_8)$

The start-up procedure of the calling application CA receives and saves the three ordered lists, which are, for this example:
AM=[$f_1$, $f_2$, $f_3$, $f_4$, $f_5$]
PARS=[$p_1$, $p_2$, $p_3$, $p_4$, $p_5$, $p_6$, $p_7$, $p_8$, $p_9$]
SIGNS=[11100000, 01001000, 00000011, 00000100, 10010001]

In the above example, SIGNS, the ordered list of the signatures of the available external methods, is in binary form, which advantageously improves the efficiencies of the algorithms that can be used also by requiring reduced storage spaces.

In order to generate the command to call an external method, e.g. method $f_5$, the following steps are performed:
at step A1, the position index idx is assigned to the value 5: idx=5. In fact, the method $f_5$ may be called either by name "$f_5$" or by providing an input number 5 to be assigned to the position index. In the first case, the name "$f_5$" is searched in AM and, if found, the found value of the position index is assigned, idx=5. In the second case, the input number is the value to be assigned to the position index, idx=5.
at step A2, the signature of the given method is derived from SIGNS by applying its position index: SIGNS(5) =[10010001]
at step A3, the parameters of method $f_5$ are gathered, from PARS, by using the acquired signature SIGNS (5), so that $f_5$ parameters [$p_1$,$p_4$,$p_8$] are gathered by entering PARS([10010001]).
at step A4, the command to call the external method $f_5$ with its required parameters is generated: call $f_5(p_1,p_4,p_8)$.

The fact that a method can be called by index may be very advantageous in some scenarios. An example is when the method indexes to be called are provided to the calling application CA when a user configures in a GUI, by using for example a toolbar menu, a set of controls to be performed which are all easily converted in a string of numbers.

Another example is when the calling application CA is requesting the execution of all the methods available from the external application EA. Using the approach of this last example, the decision of some operations to be performed, for example control operations, may be conveniently left entirely to the designers of the external application. This may result particularly advantageous since in MES systems having the possibility to perform dynamic set of control operations is a clear benefit.

Embodiments of the proposed invention advantageously allow to add or to delete an external method from the external application EA without modifying the code of the calling application CA. For example, when the set of methods to be called are received from the user configuration of a GUI or when the calling application In further embodiments of the proposed invention, the calling application CA may be interacting with more than one external application EA. In such cases, the information of each external method origin, i.e. its external application, may be stored in the available external list or in the signature list.

Thus, the calling application is advantageously enabled to call external methods even without knowing which external application EA exposes each method. It is enough to execute the initialization procedure for each connected external procedure EA so that the required lists are created for all the methods.

The invention claimed is:

1. A method for decoupling a calling application from an external application in a manufacturing execution system, wherein the calling application interacts with the external application by requesting the execution of one or more external methods defined within the external application, the method which comprises the steps of:
   by the calling application, acquiring from the external application three lists, the three lists including:
      an available external method list containing an ordered list of available external methods;
      a usable parameter list containing an ordered list of parameters usable by the external methods; and
      a signature list containing a list of signatures of the external method, a signature indicating a coded way to define a method interface;
   by the calling application, requesting a command to call a given external method from the external application, by performing the following sub-steps:
      assigning, for a given requested method, a value to a position index within the available method list;
      acquiring the signature of the given method from the signature list by applying a position index thereof;
      gathering, from the usable parameter list, required parameters of the given method as indicated from the signature thereof; and
      generating a command to call the external method with the required parameters.

2. The method according to claim 1, wherein, in the requesting step, the request for a command to call a given external method is given by index, and the step of assigning the position index value comprises assigning the given input index number.

3. The method according to claim 1, which comprises expressing the method signatures in binary from.

4. The method according to claim 1, wherein the external methods are control check operations.

5. The method according to claim 1, wherein the step of acquiring the three lists is performed at any of the following: at startup, via a polling at a given time interval, at a signaled event, or at any combination thereof.

6. A system comprising means for performing the steps of the method according to claim 1.

* * * * *